United States Patent
Nebel

(10) Patent No.: US 10,695,893 B2
(45) Date of Patent: Jun. 30, 2020

(54) CENTERING CLAMPING APPARATUS

(71) Applicant: DESTACO Europe GmbH, Oberursel (DE)

(72) Inventor: Andreas Nebel, Mönchberg (DE)

(73) Assignee: DESTACO Europe GmbH, Oberursel (DE)

( * ) Notice: Subject to any disclaimer, the term of this patent is extended or adjusted under 35 U.S.C. 154(b) by 212 days.

(21) Appl. No.: 15/886,880

(22) Filed: Feb. 2, 2018

(65) Prior Publication Data

US 2018/0154501 A1 Jun. 7, 2018

Related U.S. Application Data

(63) Continuation of application No. PCT/DE2016/100352, filed on Aug. 2, 2016.

(51) Int. Cl.
| | |
|---|---|
| B25B 5/06 | (2006.01) |
| B25B 5/16 | (2006.01) |
| B23Q 3/08 | (2006.01) |
| B25B 5/08 | (2006.01) |
| B23Q 3/18 | (2006.01) |

(52) U.S. Cl.
CPC .............. B25B 5/064 (2013.01); B23Q 3/082 (2013.01); B25B 5/166 (2013.01); B23Q 3/183 (2013.01); B25B 5/087 (2013.01)

(58) Field of Classification Search
CPC ........... B25B 5/087; B25B 5/06; B25B 5/061; B23Q 3/082
See application file for complete search history.

(56) References Cited

U.S. PATENT DOCUMENTS

| | | | | |
|---|---|---|---|---|
| 4,881,745 A * | 11/1989 | Peters | ..................... | B25B 1/106 |
| | | | | 279/2.09 |
| 5,025,340 A * | 6/1991 | Peters | ................ | G11B 17/0282 |
| | | | | 360/99.05 |
| 6,102,383 A * | 8/2000 | Tunkers | ................. | B23K 11/36 |
| | | | | 269/24 |
| 6,186,517 B1 * | 2/2001 | De Bruyn | .............. | B23Q 3/183 |
| | | | | 279/141 |

(Continued)

FOREIGN PATENT DOCUMENTS

| | | |
|---|---|---|
| DE | 297 18 643 | 12/1997 |
| EP | 0 894 572 | 2/1999 |

*Primary Examiner* — Tyrone V Hall, Jr.
(74) *Attorney, Agent, or Firm* — Harness, Dickey & Pierce, P.L.C.

(57) ABSTRACT

A centering clamping apparatus has a housing (1) with a centering element (2) mounted to be displaceable along a longitudinal axis between an open position and a clamping position. A finger element (3), mounted with centering element (2), is displaceable transversely to the longitudinal axis between a retracted position and an extended position. The finger element (3) is operatively connected to an adjusting member (4). The adjusting element (4) is mounted to be displaceable in the centering element (2). A blocking device (5) is provided on the centering element (2). The blocking device (5) either precludes a relative movement between the housing (1) and the centering element (2), with the finger element (3) fully retracted, or precludes a relative movement between the centering element (2) and the adjusting member (4), with the finger element (3) fully extended.

10 Claims, 3 Drawing Sheets

(56) References Cited

U.S. PATENT DOCUMENTS

2006/0049565 A1* 3/2006 Petit ..................... B25B 5/087
  269/32
2015/0336242 A1* 11/2015 Zajac, Jr. ............... B25B 5/087
  269/32

* cited by examiner

CENTERING CLAMPING APPARATUS

CROSS-REFERENCE TO RELATED APPLICATIONS

This application is a continuation of International Application No. PCT/DE2016/100352, filed Aug. 2, 2016, which claims priority to German Application No. 102015112686.9, filed Aug. 3, 2015. The disclosures of the above applications are incorporating herein by reference.

FIELD

The disclosure relates to a centering clamping apparatus with a housing and a centering element mounted to be displaceable along a longitudinal axis between an open position and a clamping position. A finger element, mounted with the centering element, is displaceable transversely to the longitudinal axis between a retracted position and an extended position. The finger element is operatively connected to an adjusting member. The adjusting element is mounted to be displaceable in the centering element. A blocking device is provided on the centering element. The blocking device either precludes a relative movement between the housing and the centering element, with the finger element fully retracted, or precludes a relative movement between the centering element and the adjusting member, with the finger element fully extended.

BACKGROUND

A centering clamping apparatus of the aforementioned type is known from the as yet unpublished U.S. patent application Ser. No. 14/538,990. This centering clamping apparatus consists of a housing and a centering element mounted to be displaceable along a longitudinal axis between an open position and a clamping position. A finger element, mounted on the centering element, is displaceable transversely to the longitudinal axis between a retracted position and an extended position. The finger element is operatively connected with an adjusting member displaceably mounted in the centering element. Within the framework of the disclosure, the finger element is always provided with at least one finger element and two finger elements are actually provided in the above described solution.

SUMMARY

It is an object of the disclosure to improve a centering clamping apparatus of the kind mentioned at the outset. In particular, a centering clamping apparatus with a precisely coordinated motion sequence is created with respect to the interplay between the centering element and finger element.

This object is achieved with a centering clamping apparatus that has a housing with a centering element mounted to be displaceable along a longitudinal axis between an open position and a clamping position. A finger element, mounted with the centering element, is displaceable transversely to the longitudinal axis between a retracted position and an extended position. The finger element is operatively connected to an adjusting member. The adjusting element is mounted to be displaceable in the centering element. A blocking device is provided on the centering element. The blocking device either precludes a relative movement between the housing and the centering element, with the finger element fully retracted, or precludes a relative movement between the centering element and the adjusting member, with the finger element fully extended.

The disclosure also provides the centering element with a blocking device. The blocking device either precludes a relative movement between the housing and the centering element with the finger element fully retracted or it precludes a relative movement between the centering element and the adjusting member with the finger element fully extended.

The centering clamping apparatus blocking device ensures that, in specific situations, either a relative movement between the centering element and the housing or a relative movement between the centering element and the adjusting member is precluded. More particularly, at any time the finger element is completely retracted into the centering element, a relative movement between the centering element and the housing is precluded. As a result of this, a movement of the adjusting member initially exclusively causes the finger element to extend. If the finger element is extended, further movement of the adjusting member causes the centering element to move relative to the housing. In addition, it is simultaneously provided that, at any time the finger element is completely extended, a relative movement between the centering element and the adjusting member is precluded. As a result of this, a movement of the adjusting member initially exclusively causes the centering element to move or extend. If the centering element has then been extended, further moving the adjusting element causes the finger element to move relative to the centering element.

In the above-mentioned open position, the centering element is in an extended, "upper" position, and the finger element is in the retracted position ("inside" of the centering element). In the aforementioned clamping position, the centering element is in a retracted, "lower" position, and the finger element is in an extended position ("outside" of the centering element). Proceeding from the open position, the motion sequence according to the disclosure is as follows. A movement of the adjusting member ("downward") initially causes the finger element to extend. Once the latter has been extended, further movement of the adjusting member causes the centering element to move ("downward"). This specifically occurs until the clamping position has been reached. Accordingly, the workpiece is fixedly clamped between the finger element and the housing of the clamping apparatus. If the clamping position is again to be released at another point in time, the adjusting member initially moves ("upward") causing the centering element to move ("upward"). The finger element remains extended, as before. When the centering element has reached the extended, "upper" position, further movement of the adjusting member causes the finger element to retract. This leads to a position of the clamping apparatus where the workpiece can be removed from the centering element.

Using the blocking device according to the disclosure results in an improved coordination of motion sequences. For example, a very advantageous effect, as will be discussed in even more detail below, occurs for sheets with centering holes with raised edges. The blocking device makes it possible to prevent a jamming of the finger element with the sheet as has happened in previous clamping apparatus.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

DETAILED DESCRIPTION

The centering clamping apparatus depicted in the figures includes a housing 1 with at least a partially hollow cylindrical centering element 2. The centering element 2 is mounted to be displaceable along a longitudinal axis between an open position and a clamping position. A finger element 3 is mounted on the centering element 2. The finger element 3 is displaceable transversely or perpendicularly to the longitudinal axis between a retracted position and an extended position. The finger element 3 is operatively connected with a cylindrically designed adjusting member 4. The adjusting member 4 is mounted to be displaceable in the centering element 2.

Figure 2:
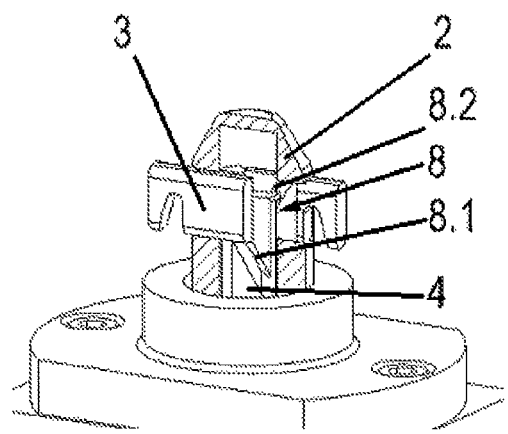
FIG. 2 is a perspective view of the centering element for activating the inversely hooked finger element with the adjusting member partially in cross-section.

As mentioned above, the finger element 3 is to be construed to mean "at least one" finger element. Here, the depicted embodiments shows two finger elements. A sliding block guide 8 is provided for activating the finger element 3. The sliding block guide 8 is arranged between the finger element 3 and the adjusting member 4. As illustrated in FIG. 2, the sliding block guide 8 includes a slot 8.2, groove or the like on the finger element 3. The slot 8.2 runs inclined relative to the longitudinal axis. A key-like element 8.1, journal or the like on the adjusting member 4, is guided in the slot 8.2. Alternatively, the key-like element 8.1 is situated on the finger element 3 and the slot 8.2 is situated on the adjusting member 4. Therefore, if the adjusting member 4 in FIG. 2 is upwardly displaced, this causes the finger element 3 to retract, and vice versa.

The centering clamping apparatus according to the disclosure includes the centering element 2 provided with a blocking device 5. The blocking device 5 either precludes a relative movement between the housing 1 and the centering element 2, with the finger element 3 fully retracted, or it precludes a relative movement between the centering element 2 and the adjusting member 4, with the finger element 3 fully extended. This makes certain that a collision between the finger element 3 and workpiece 9, having an upwardly projecting collar 9.1, is prevented. The disclosure ensures that the finger element 3 is always retracted and extended only with the centering element 2. At least partially extended means the finger element 3 is no longer in contact with the workpiece 9.

The blocking device 5 interacts with the housing 1 and the adjusting member 4. The blocking device 5 is arranged on the centering element 2. A blocking element 5.1 is provided that is displaced transversely to the longitudinal axis. As shown, two or more blocking elements 5.1 can also be provided. The blocking element 5.1 is designed as a body having a circular cross section at least in one spatial direction. If the body is designed as a cylindrical bolt, it correspondingly has a circular cross section in precisely one spatial direction or a cylindrical outer contour. This embodiment is not additionally shown below, but is indeed also realizable and functional. If the blocking element 5.1 is designed as a sphere, as preferred and depicted, it has a circular cross section or spherical surface in all spatial directions.

Regardless of the actual outer shape of the blocking element 5.1, it is evident that the blocking element 5.1 is free of any guiding elements that engage into its body.

In order to realize the mentioned displaceability, the centering element 2 includes a guide 2.1 for the blocking element 5.1. A guide or the length of the guide 2.1 is shorter viewed transversely to the longitudinal axis than a corresponding length or than a corresponding diameter of the blocking element 5.1. As illustrated in FIGS. 4 to 11, the blocking element 5.1 is always in contact with either the housing 1 or with the actuating member 4.

Accordingly, the housing 1 includes a guiding path 6 for the blocking element 5.1. Preferably, the guide path runs parallel to the longitudinal axis and includes two path sections 6.1, 6.2. Depending on position, either the blocking element 5.1 is in contact with the first path section 6.1 or second path section 6.2. The first path section is designed to permit a relative movement between the centering element 2 and the adjusting member 4. The second path section 6.2 is designed to prevent such a movement.

A stop device 7 limits the displaceability of the adjusting member 4 to the centering element on both sides. It includes a stop element 7.1 arranged on the adjusting member 4 and abutments 7.2 arranged on the centering element 2. The abutments 7.2 are arranged on either side of the stop element 7.1 (above and below). A distance, present parallel to the longitudinal axis, is further formed between the two abutments 7.2. The distance is larger than an extension of the stop element 7.1 formed parallel to the longitudinal axis. In order to be able to easily assemble the device, one abutment 7.2 is also rigidly, yet detachably connected with the centering element 2. The centering element 2 has a cylindrical guide space 2.2 for guiding the stop element. The two abutments 7.2 still preferably each form a wall area of the guide space 2.2.

The blocking element 5.1 is further designed to interact with the stop element 7.1. The stop element 7.1 has two sections 7.1.1, 7.1.2 viewed in the direction of the longitudinal axis.

More particularly, the first section 7.1.1 has a cylindrical outer contour that matches the guide space 2.2. Thus, the first section 7.1.1 is designed to keep the blocking element 5.1 out of the guide space 2.2.

The second section 7.1.2 is designed like a hyperboloid. A largest diameter of the hyperboloid preferably corresponds to the diameter of the first section 7.1.1. The rotational axis of the hyperboloid also coincides with the longitudinal axis of the centering element. The second section 7.1.2 is designed as a guide curve for the blocking element 5.1. Thus, while the transition from the first to the second section may not be constant (in the mathematical sense), it is smooth in design. This means that the bodies or balls having a circular cross section can readily slide along the stop element 7.1.

The centering clamping apparatus according to the disclosure functions as follows. The starting point for the explanation is FIG. 4. Here, the centering clamping apparatus according to the disclosure in an open position with a workpiece 9 placed on it. The workpiece may be a sheet with a round opening and a collar 9.1 around the opening. The adjusting member 4 is in its highest position. The section 7.1.1 of the stop element 7.1 presses the blocking element 5.1 outwardly against the path section 6.2. This prevents a relative (downward) movement between the housing 1 and centering element 2. An upward movement is prevented by suitable shoulders on the housing 1 and on the centering element 2.

Figure 1:
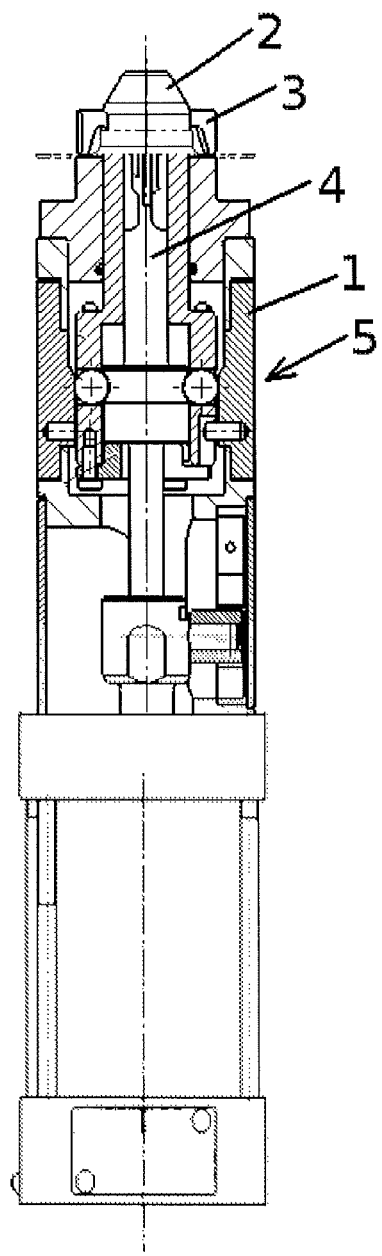
FIG. 1 is a partial cross-section view of the centering clamping apparatus according to the disclosure in a clamping position with an extended inversely hooked finger element.
Figure 3:
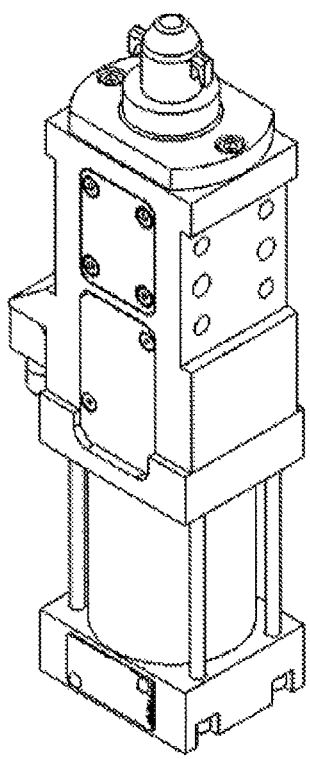
FIG. 3 is a perspective view of the centering clamping apparatus according to FIG. 1.
Figure 4:
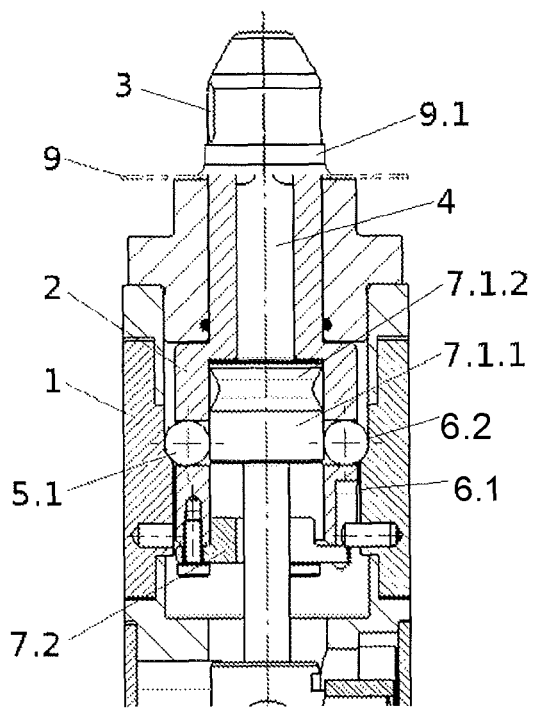
FIGS. 4 to 11 are sectional views of the centering clamping apparatus according to FIG. 1 in various positions between the open position and the clamping position.
Figure 5:
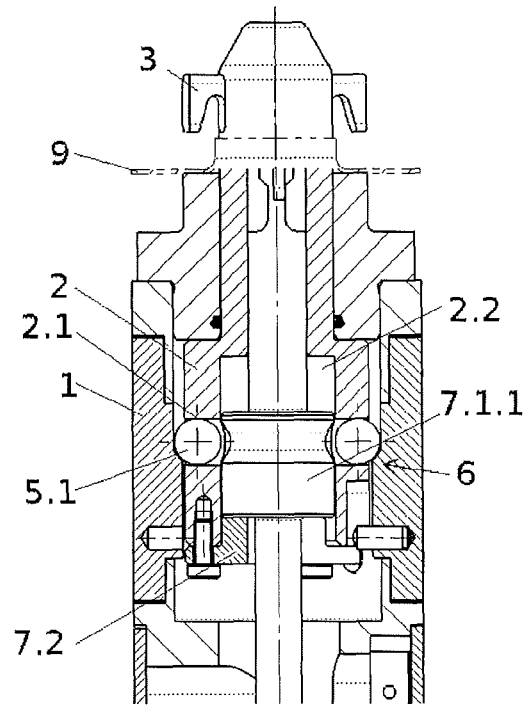

FIG. 5 presents the next adjusting step. Here, the adjusting member 4 moves downwardly. For example, by a suitable (see FIGS. 1 and 3) pneumatic drive. It moves downward until the stop first section 7.1.1 reaches the bottom abutment 7.2 of the stop device 7. This causes the two finger elements 3, that are still retracted in FIG. 4, to now extend. FIG. 5 further illustrates the at least one blocking element 5.1, here shown as two balls in this case, at this moment still preventing a relative movement between the housing 1 and centering element 2.

Figure 6:
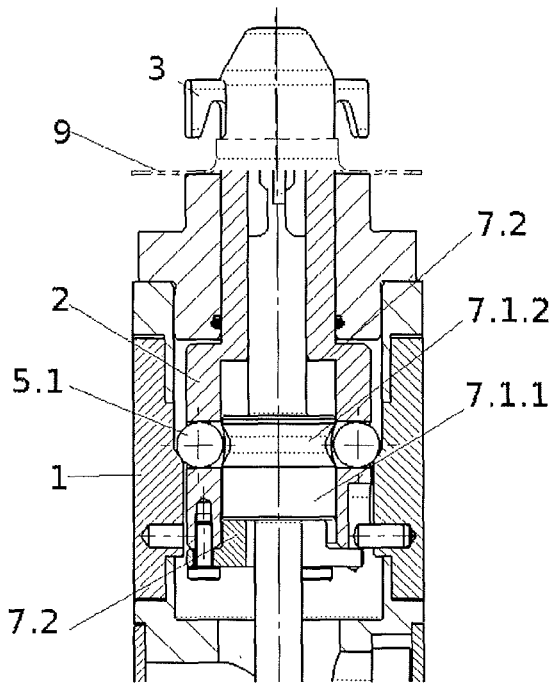
Figure 7:
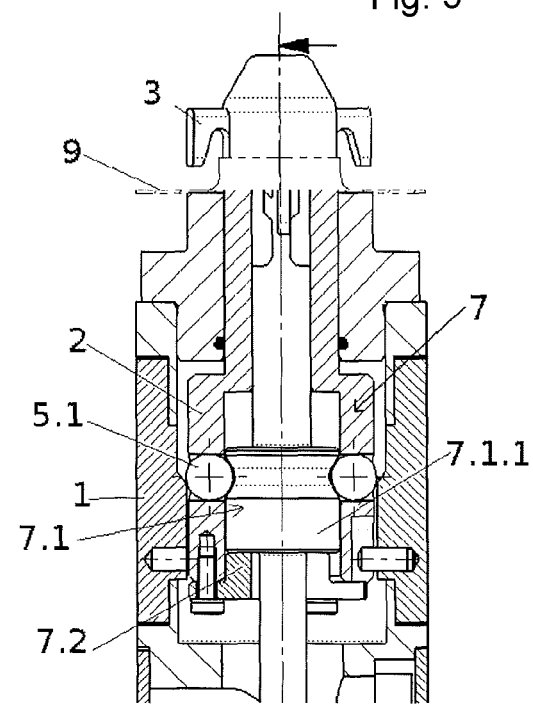

FIGS. 6 and 7 illustrate further downwardly adjusting of the adjusting member 4. This causes the two balls inside of the guide 2.1 to be inwardly displaced as a result of the narrowing shoulder between the two path sections 6.1 and 6.2. The displacement inside of the guide 2.1 is enabled by the hyperboloid shape of the second section 7.1.2 of the stop element 7.1. In addition, in a comparison between FIGS. 5 to 7 demonstrates how the centering element 2 moves downwardly inside of the housing 1, without the finger elements 3 also moving in the process.

Figure 8:
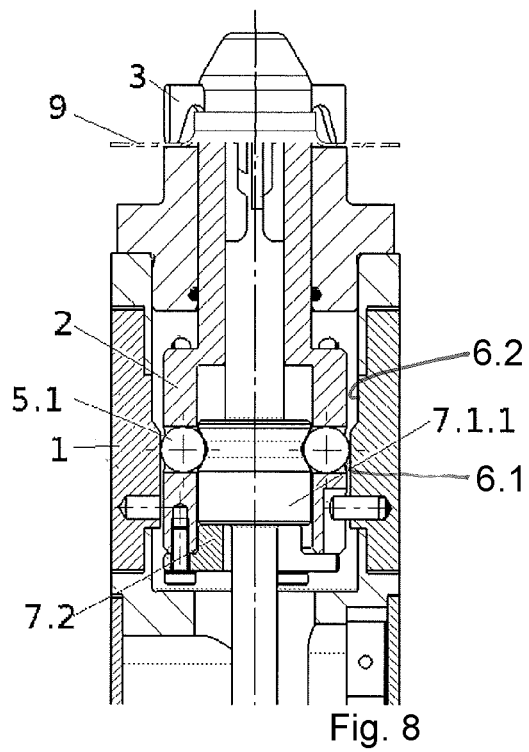
Figure 9:
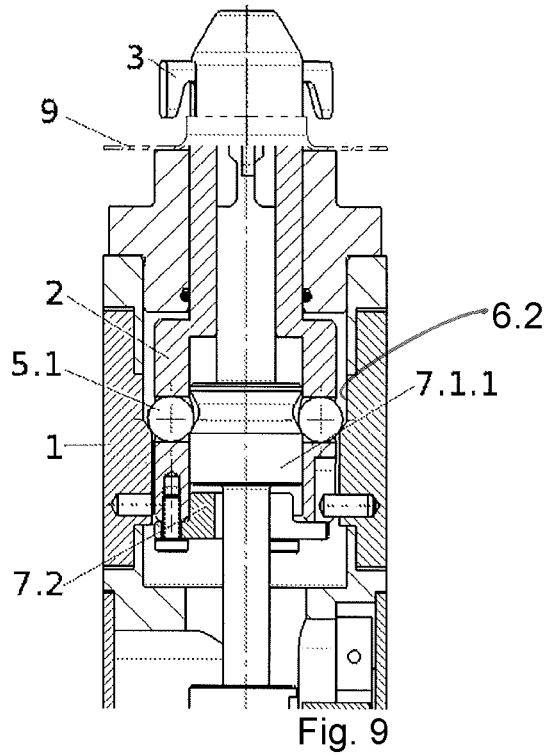
Figure 10:
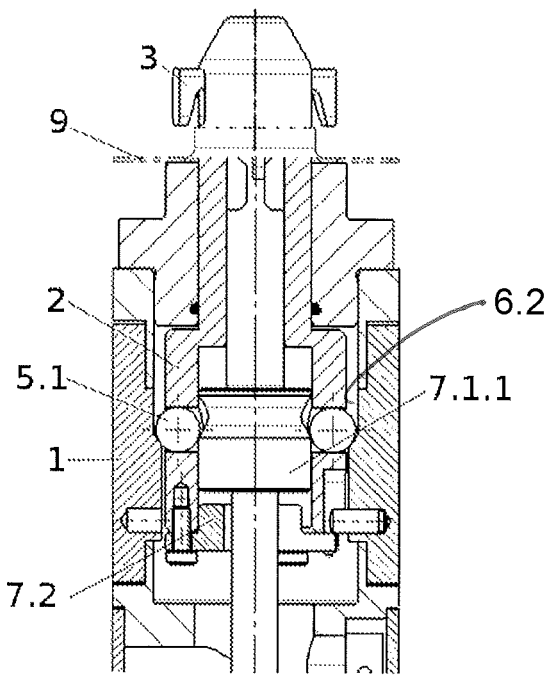

FIG. 8 shows the clamping position. The inversely hooked finger elements 3 include a recess to accommodate a collar 9.1 of the workpiece 9, press the workpiece 9 against a corresponding support on the housing 1 of the centering clamping apparatus extended state on the centering and blocking element side. The two bodies or balls, in this position, together with the first path section 6.1 cause the centering element 2 and adjusting member 4 to be fixed relative to each other. Thus, this precludes a relative movement between the two.

If an upwardly acting force is now applied to the adjusting member 4 at another point in time to open the centering clamping apparatus, it causes the centering element 2 to move upwardly. This occurs without changing the extended position of the finger elements 3 in the process.

Once the bodies or balls get into the area of the second path section 6.2 (see FIGS. 9 and 10), they can correspondingly move outwardly. It is not just the centering element 2 being upwardly displaced but also the adjusting member 4 inside of the centering element 2. This movement, in turn, initiates the retraction of the finger elements 3. In this way, the inversely hooked finger elements 3 are prevented from becoming jammed with the collar 9.1.

Figure 11:
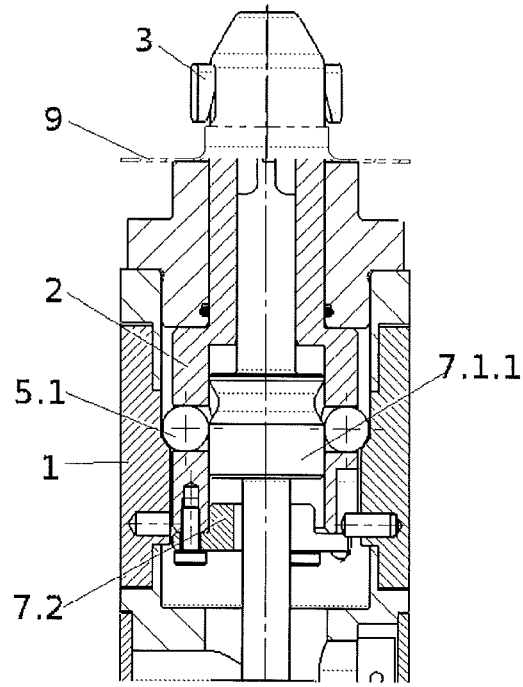

Finally, FIG. 11 illustrates where the blocking element 5.1 completely abuts against the second path section 6.2. Here, the first section 7.1.1 of the stop element 7.1 can move freely by the bodies or balls. Thus, this completely retracts the finger elements 3, as depicted once again in FIG. 4.

The present disclosure has been described with reference to the preferred embodiment. Obviously, modifications and alternations will occur to those of ordinary skill in the art upon reading and understanding the preceding detailed description. It is intended that the present disclosure be construed to include all such alternations and modifications insofar as they come within the scope of the appended claims or their equivalents.

What is claimed is:

1. A centering clamping apparatus comprising:
    a housing with a centering element displaceably mounted in the housing for movement along a longitudinal axis between an open position and a clamping position;
    a finger element is displaceably mounted on the centering element, the finger element is displaceable transversely to the longitudinal axis between a retracted position and an extended position, the finger element is operatively connected with an adjusting member, the adjusting member is displaceably mounted in the centering element; and
    the centering element is provided with a blocking device and in response to displacement of the adjusting member with respect to the centering element, the blocking device either precludes a relative movement between the housing and the centering element, with the finger element fully retracted, or precludes a relative movement between the centering element and the adjusting member, with the finger element fully extended.

2. The centering clamping apparatus according to claim 1, wherein the blocking device comprises a blocking element displaceable transverse to the longitudinal axis.

3. The centering clamping apparatus according to claim 2, wherein the centering element includes a guide for the blocking element.

4. The centering clamping apparatus according to claim 3, wherein a length of the guide viewed transversely to the longitudinal axis is shorter than a corresponding length of the blocking element.

5. The centering clamping apparatus according to claim 2, wherein the housing includes a guiding path for the blocking element that runs parallel to the longitudinal axis and has a first and second path section, when the blocking element is in contact with a first path section, it enables a relative movement between the centering element and the adjusting member, and when the blocking element is in contact with the second path section it prevents such a movement.

6. The centering clamping apparatus according to claim 2, wherein a stop device limits the displaceability of the adjusting member to the centering element on both sides, the stop device includes a stop element arranged on the adjusting member and abutments arranged on the centering element on either side of the stop element, the blocking element is designed to interact with the stop element.

7. The centering clamping apparatus according to claim 6, wherein the centering element has a cylindrical guide space for guiding the stop element.

8. The centering clamping apparatus according to claim 6, wherein the stop element has two sections viewed in the direction of the longitudinal axis.

9. The centering clamping apparatus according to claim 8, wherein a first section has a cylindrical outer contour that matches the guide space.

10. The centering clamping apparatus according to claim 9, wherein a second section is designed as a hyperboloid, and a largest diameter of the hyperboloid corresponds to a diameter of the first section.

* * * * *

UNITED STATES PATENT AND TRADEMARK OFFICE
CERTIFICATE OF CORRECTION

PATENT NO. : 10,695,893 B2  
APPLICATION NO. : 15/886880  
DATED : June 30, 2020  
INVENTOR(S) : Andreas Nebel Page 1 of 1

It is certified that error appears in the above-identified patent and that said Letters Patent is hereby corrected as shown below:

On the Title Page

Please add:  
(30) Foreign Application Priority Data  
August 3, 2015 (DE) 102015112686.9

Signed and Sealed this  
Twenty-ninth Day of June, 2021

Drew Hirshfeld  
*Performing the Functions and Duties of the*  
*Under Secretary of Commerce for Intellectual Property and*  
*Director of the United States Patent and Trademark Office*